(12) United States Patent
Cheng

(10) Patent No.: US 10,998,759 B2
(45) Date of Patent: May 4, 2021

(54) UNINTERRUPTIBLE POWER SUPPLY WITH DC OUTPUT

(71) Applicant: DELTA ELECTRONICS, INC., Taoyuan (TW)

(72) Inventor: Chung-Chieh Cheng, Taoyuan (TW)

(73) Assignee: Delta Electronics, Inc., Taoyuan (TW)

( * ) Notice: Subject to any disclaimer, the term of this patent is extended or adjusted under 35 U.S.C. 154(b) by 0 days.

(21) Appl. No.: 16/431,069

(22) Filed: Jun. 4, 2019

(65) Prior Publication Data

US 2020/0251925 A1     Aug. 6, 2020

(30) Foreign Application Priority Data

Feb. 1, 2019  (CN) .......................... 201910101871.5

(51) Int. Cl.
| | | |
|---|---|---|
| *H02J 9/06* | (2006.01) | |
| *H02J 7/02* | (2016.01) | |
| *H02M 1/42* | (2007.01) | |
| *H02M 1/44* | (2007.01) | |
| *H02M 3/24* | (2006.01) | |

(52) U.S. Cl.
CPC .............. *H02J 9/061* (2013.01); *H02J 7/022* (2013.01); *H02M 1/4208* (2013.01); *H02M 1/44* (2013.01); *H02M 3/24* (2013.01)

(58) Field of Classification Search
None
See application file for complete search history.

(56) References Cited

U.S. PATENT DOCUMENTS

| | | | |
|---|---|---|---|
| 5,576,941 A | | 11/1996 | Nguyen et al. |
| 5,982,652 A | * | 11/1999 | Simonelli ............ H05K 7/1492 363/142 |
| 6,917,125 B2 | | 7/2005 | Yim |
| 2002/0071292 A1 | | 6/2002 | Aihara et al. |
| 2004/0189253 A1 | | 9/2004 | Tanabe et al. |
| 2008/0164761 A1 | | 7/2008 | O'Bryant et al. |

(Continued)

FOREIGN PATENT DOCUMENTS

| | | |
|---|---|---|
| EP | 0696831 A2 | 2/1996 |
| JP | 2004304941 A | 10/2004 |

(Continued)

OTHER PUBLICATIONS

Office Action dated Aug. 15, 2019 in TW Application No. 108104003 (6 pages).

(Continued)

*Primary Examiner* — Cassandra F Cox
(74) *Attorney, Agent, or Firm* — Muncy, Geissler, Olds & Lowe, P.C.

(57) ABSTRACT

An uninterruptible power supply with DC output includes an AC-to-DC conversion circuit coupled to an AC power source for outputting a first DC power source, a charging and discharging module for outputting a second DC power source, at least one power module coupled to the AC-to-DC conversion circuit and the charging and discharging module, a user operation interface disposed between the at least one power module and at least one load, and the user operation interface includes at least one operation unit, the power required for each load is selected by each operation unit so that at least one power module uninterruptedly supplies power to each load.

17 Claims, 14 Drawing Sheets

(56) References Cited

U.S. PATENT DOCUMENTS

| | | | |
|---|---|---|---|
| 2008/0179956 A1 | 7/2008 | Jiang et al. | |
| 2011/0121654 A1* | 5/2011 | Recker | H02J 7/345 307/66 |
| 2013/0002024 A1* | 1/2013 | Beg | H02J 1/108 307/64 |
| 2017/0366022 A1* | 12/2017 | Yu | H02J 9/061 |
| 2018/0287408 A1 | 10/2018 | Kutkut | |
| 2019/0356159 A1* | 11/2019 | Coccia | G06F 1/18 |

FOREIGN PATENT DOCUMENTS

| | | |
|---|---|---|
| JP | 2012143104 A | 7/2012 |
| JP | 2012175801 A | 9/2012 |
| JP | 2013251963 A | 12/2013 |
| JP | 2016012121 A | 1/2016 |
| TW | 200625752 A | 7/2006 |
| TW | 602382 B | 10/2017 |
| WO | WO-2005/074096 A1 | 8/2005 |
| WO | WO-2008/086340 A2 | 7/2008 |
| WO | WO-2016/063946 A1 | 4/2016 |

OTHER PUBLICATIONS

European Search Report dated Nov. 25, 2019 in EP Application No. 19177812.5 (6 pages).

* cited by examiner

US 10,998,759 B2

UNINTERRUPTIBLE POWER SUPPLY WITH DC OUTPUT

BACKGROUND

Technical Field

The present disclosure relates to a power supply with DC output, and more particularly in particular to an uninterruptible power supply with DC output that each output thereof may be arbitrarily adjusted and has an uninterruptible power supply function.

Description of Related Art

The statements in this section merely provide background information related to the present disclosure and do not necessarily constitute prior art.

In general, the conventional power supplies are typically configured to correspond to the power (or voltage, current) required by each electronic device. Due to the increasing variety of electronic products used by modern people, related companies have developed power supplies with multiple output ports, allowing users to use multiple types and multiple numbers of the electronic devices simultaneously through only one mains input port, thereby achieving a one-input-to-multiple-output power supply architecture.

However, in the actual use of the power supply with multiple output ports, since it is necessary to adapt to various needs, if each of the output ports cannot arbitrarily adjust the output-related electrical values according to the use's requirement, the number of output ports would be difficult to reduce, not only it is bulky so it is not easy to carry, but also the production cost is higher. In addition, the conventional power supply cannot protect the safety of the plurality of loads connected to it in the event of sudden abnormal supply situation of the mains, especially for electronic devices such as computer hosts, monitoring systems, precision electronic instruments, and medical instruments, etc. When the mains supply is interrupted, the electronic devices are likely to cause internal parts damage or data loss due to sudden power interruption, which may cause serious and irreversible consequences.

Therefore, how to design an uninterruptible power supply with DC output to solve the technical problems above is an important subject studied by the inventors and proposed in the present disclosure.

SUMMARY

An objective of the present disclosure is to provide an uninterruptible power supply with DC output, it may solve the technical problem with each of the output ports cannot arbitrarily adjust the output-related electrical value according to the use's requirement, and solve the technical problem with cannot protect the safety of the plurality of loads connected to the uninterruptible power supply with DC output in the event of sudden abnormal supply situation of the mains. Achieving the objective of reducing the size, reducing the production cost, and avoiding hardware damage and data loss due to sudden power interruption.

In order to achieve the objective, an uninterruptible power supply with DC output includes an AC-to-DC conversion circuit coupled to an AC power source for outputting a first DC power source, a charging and discharging module for outputting a second DC power source, at least one power module coupled to the AC-to-DC conversion circuit and the charging and discharging module, and to receive one of the first DC power source and the second DC power source, and a user operation interface disposed between the at least one power module and at least one load, and the user operation interface includes at least one operation unit, wherein the power required for each load is selected by each operation unit so that at least one power module uninterruptedly supplies power to each load.

In order to achieve the objective, another uninterruptible power supply with DC output includes a power factor correction stage circuit coupled to an AC power source for outputting a first DC power source, a charging and discharging module for outputting a second DC power source, at least one power module coupled to the power factor correction stage circuit to receive one of the first DC power source and the second DC power source, and a user operation interface disposed between the at least one power module and at least one load, and the user operation interface includes at least one operation unit, wherein the power required for each load is selected by each operation unit so that at least one power module uninterruptedly supplies power to each load.

During use of any one of the uninterruptible power supply with DC output of the present disclosure, as the AC power source is normal, at least one power module receives the first DC power source, as the AC power source is abnormal, at least one power module receives the second DC power source, in addition, since the user may select the power required for each load through at least one operation unit (which may be a dip switch, a knob, etc.), so the at least one power module converts one of the first DC power source and the second DC power source, and uninterruptedly supplies power to at least one load.

DETAILED DESCRIPTION

Figure 1:
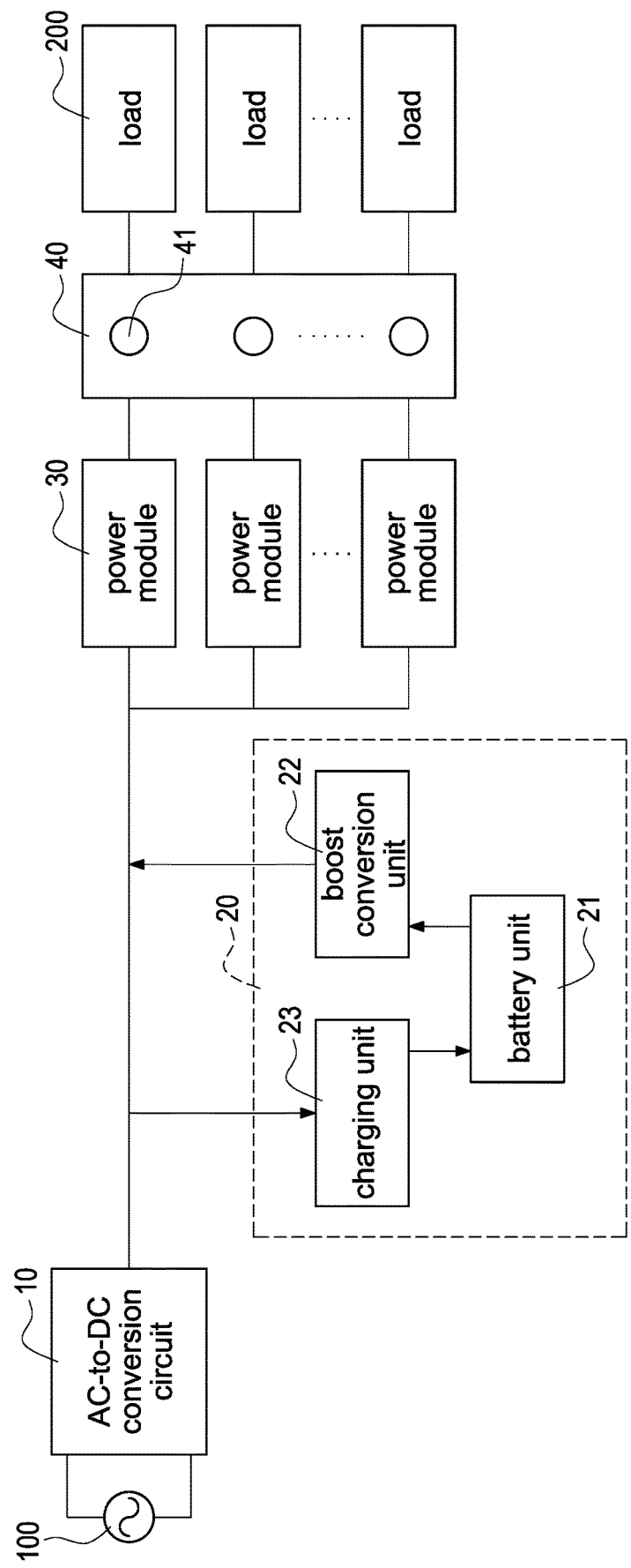
FIG. 1 is a structural diagram of an uninterruptible power supply with DC output according to a first embodiment of the present disclosure.

The embodiments of the present disclosure are described by way of specific examples, and those skilled in the art may readily appreciate the other advantages and functions of the present disclosure. The present disclosure may be embodied or applied in various other specific embodiments, and various modifications and changes may be made without departing from the spirit and scope of the present disclosure.

It should be understood that the structures, the proportions, the sizes, the number of components, and the like in the drawings are only used to cope with the contents disclosed in the specification for understanding and reading by those skilled in the art, and it is not intended to limit the conditions that may be implemented in the present disclosure, and thus is not technically significant. Any modification of the structure, the change of the proportional relationship, or the adjustment of the size, should be within the scope of the technical contents disclosed by the present disclosure without affecting the effects and the achievable effects of the present disclosure.

The technical content and detailed description of the present disclosure will be described below in conjunction with the drawings.

Figure 2A:
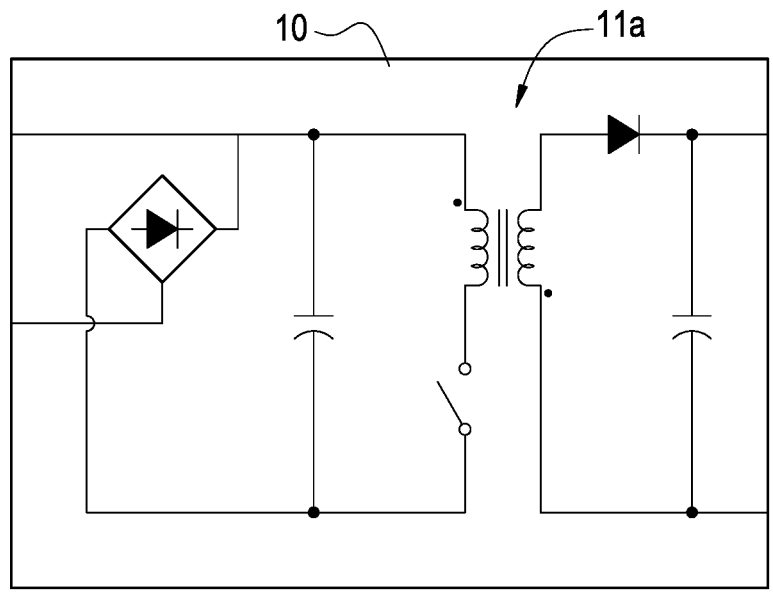
FIG. 2A to FIG. 2F are circuit diagrams of an AC-to-DC conversion circuit of the uninterruptible power supply with DC output according to the present disclosure.
Figure 2B:
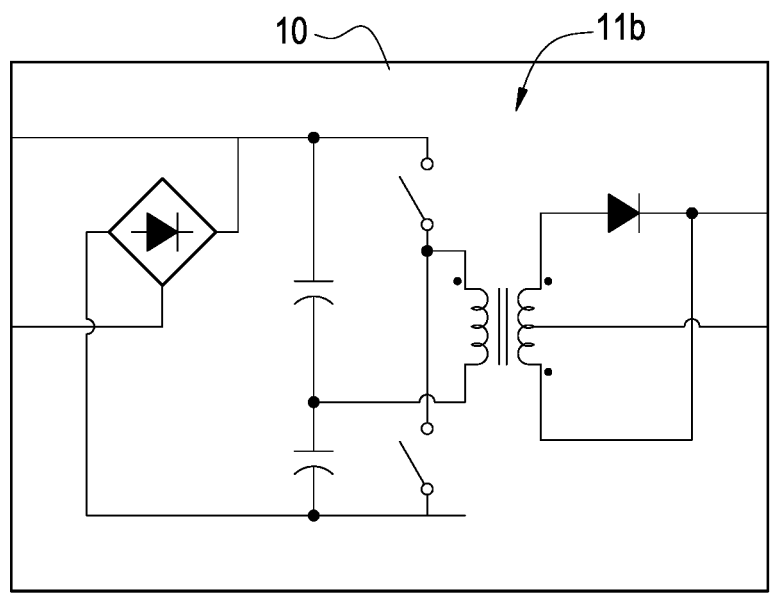
Figure 2C:
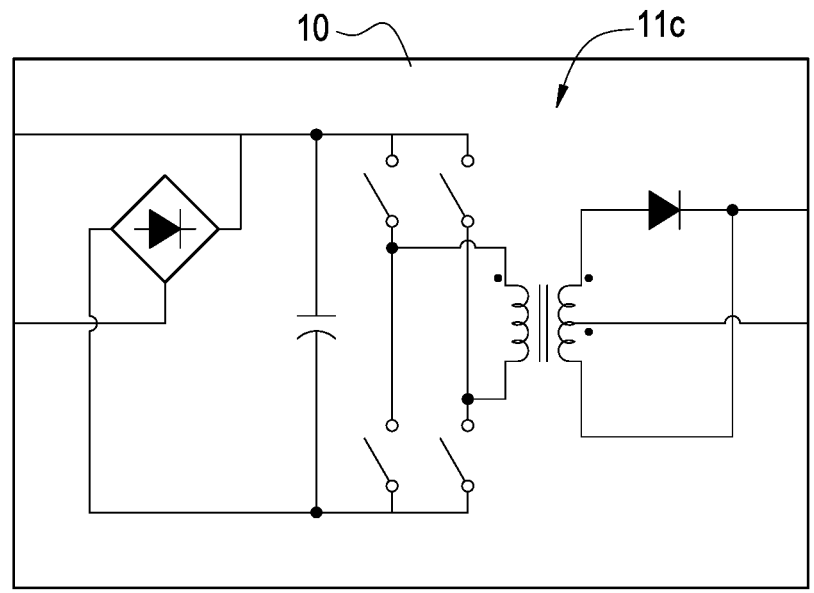
Figure 2D:
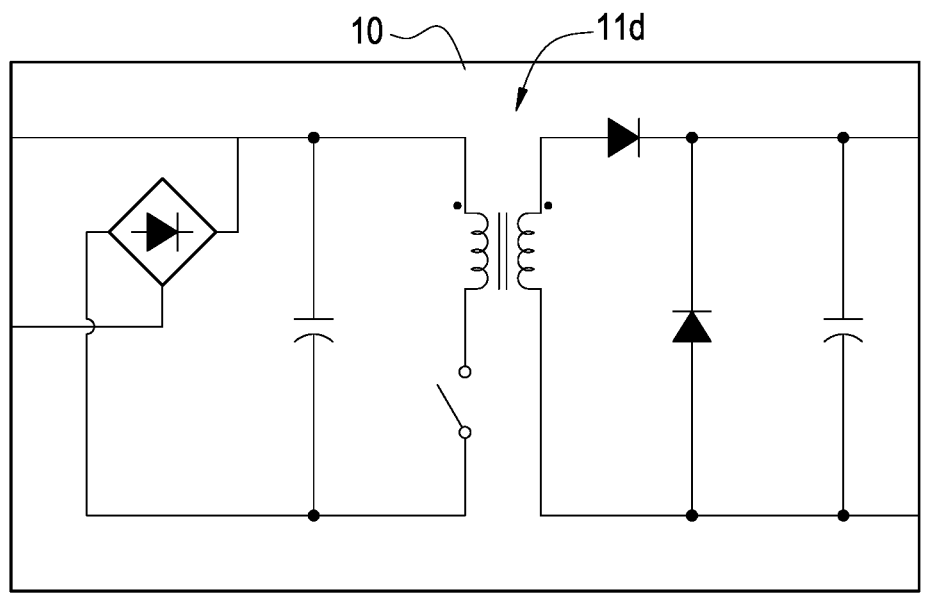
Figure 2E:
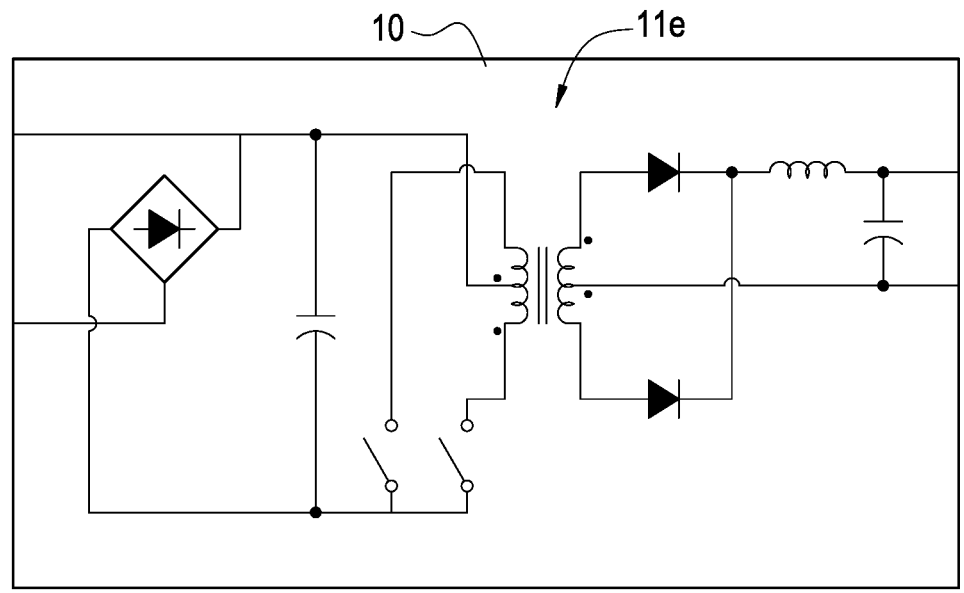
Figure 2F:
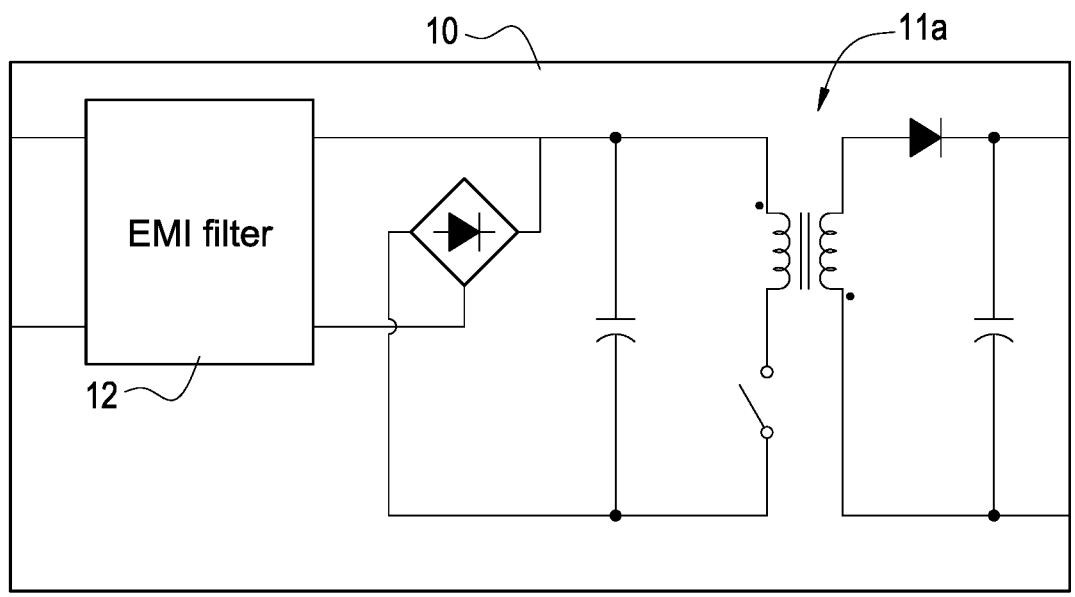

Referring to FIG. 1 to FIG. 2F. FIG. 1 is a structural diagram of an uninterruptible power supply with DC output according to a first embodiment of the present disclosure. FIG. 2A to FIG. 2F are circuit diagrams of an AC-to-DC conversion circuit of the uninterruptible power supply with DC output according to the present disclosure.

As shown in FIG. 1, the uninterruptible power supply with DC output according to the first embodiment of the present disclosure includes an AC-to-DC conversion circuit 10, a charging and discharging module 20, at least one power module 30, and a user operation interface 40.

The AC-to-DC conversion circuit 10 is coupled to an AC power source 100, and converts the AC power source 100 to output a first DC power source (not shown). The charging and discharging module 20 is coupled to the AC-to-DC conversion circuit 10 and outputs a second DC power source (not shown).

The charging and discharging module 20 includes a battery unit 21, a boost conversion unit 22, and a charging unit 23. The battery unit 21 may be a rechargeable battery storage device such as a lithium battery, a nickel-hydrogen battery, a hydrogen-oxygen battery, or a lead-acid battery, but the present disclosure is not limited thereto. The boost conversion unit 22 is coupled to the battery unit 21 and the at least one power module 30. In the first embodiment of the present disclosure, the charging unit 23 is coupled to the battery unit 21 and a DC output side of the AC-to-DC conversion circuit 10 (as shown in FIG. 1). When the battery unit 21 is charged, the charging unit 23 receives the first DC power source outputted from the AC-to-DC conversion circuit 10 and converts it into a voltage that is suitable for charging the battery unit 21.

At least one power module 30 is coupled to the AC-to-DC conversion circuit 10 and the charging and discharging module 20, and receives one of the first DC power source and the second DC power source. Further, when the AC power source 100 is normal, each power module 30 receives the first DC power source, and converts the first DC power source to provide power required for each load 200. When the AC power source 100 is abnormal, the battery unit 21 outputs electric energy, and a output voltage of the battery unit 21 is boosted by the boost conversion unit 22 to provide the second DC power source, so that each power module 30 receives the second DC power source and converts the second DC power source to provide the power required for each load 200 to uninterruptedly supply power to each load 200.

The user operation interface 40 is coupled to the at least one power module 30 and the at least one load 200. The user operation interface 40 provides at least one operation unit 41 to control the coupling (ON) or decoupling (OFF) between the power modules 30 and the loads 200, and select the power required for each load 200. The operation unit 41 may be an adjustable structure such as a dial switch, a knob, etc., but the present disclosure is not limited thereto. Therefore, the user may arbitrarily match different numbers of loads, adjust the power value required for each load 200, or according to the user's requirement or each load 200 to arbitrarily adjust at least one relevant electrical value (such as at least one of a voltage value and a current value), then output it by the power module 30. In the first embodiment of the present disclosure, each operation unit 41 may correspondingly control one power module 30, or each operation unit 41 may simultaneously control two or more than two power modules 30 to meet high power demand of the loads 200. Each power module 30 converts one of the first DC power source and the second DC power source to uninterruptedly supply power to each load 200.

As shown in FIG. 2A to FIG. 2F, in the uninterruptible power supply with DC output according to the first embodiment of the present disclosure, the AC-to-DC conversion circuit 10 may include an isolated topology structure coupled to the AC power source 100. In the first embodiment of the present disclosure, the isolated topology structure may be one of a flyback circuit 11a (as shown in FIG. 2A), a half-bridge circuit 11b (as shown in FIG. 2B), a full-bridge circuit 11c (shown in FIG. 2C), a forward circuit 11d (shown in FIG. 2D), and a push-pull circuit 11e (shown in FIG. 2E). Further, the AC-to-DC conversion circuit 10 may further include an electro-magnetic interference (EMI) filter 12 (shown in FIG. 2F), which may be combined with any of the above-mentioned isolated topology structures to form the AC-to-DC conversion circuit 10.

Figure 3A:
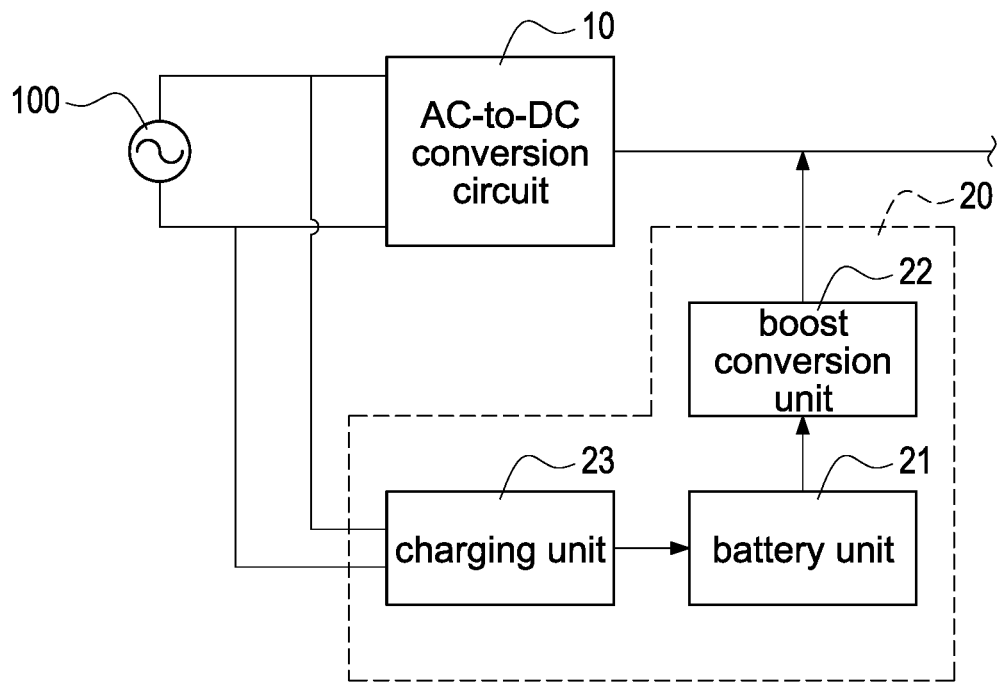
FIG. 3A is a circuit block diagram showing a configuration of the AC-to-DC conversion circuit and a charging and discharging module of the uninterruptible power supply with DC output according to a second embodiment of the present disclosure.
Figure 3B:
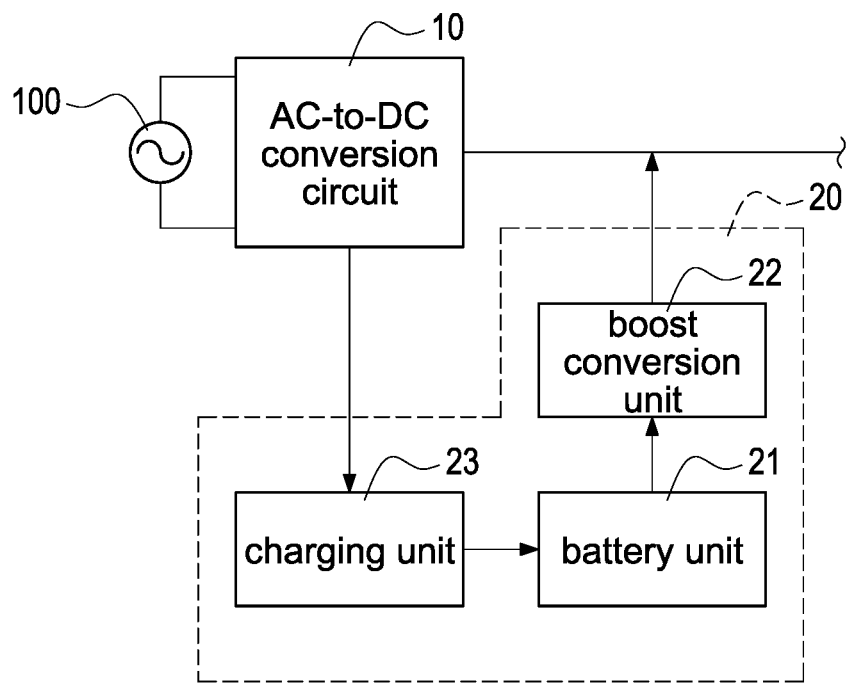
FIG. 3B is a circuit block diagram showing a configuration of the AC-to-DC conversion circuit and the charging and discharging module of the uninterruptible power supply with DC output according to a third embodiment of the present disclosure.

Referring to FIG. 3A and FIG. 3B. FIG. 3A is a circuit block diagram showing a configuration of an AC-to-DC conversion circuit 10 and a charging and discharging module 20 of the uninterruptible power supply with DC output according to a second embodiment of the present disclosure. FIG. 3B is a circuit block diagram showing a configuration of the AC-to-DC conversion circuit 10 and the charging and discharging module 20 of the uninterruptible power supply with DC output according to a third embodiment of the present disclosure.

As shown in FIG. 3A, the second embodiment of the uninterruptible power supply with DC output of the present disclosure is substantially the same as the first embodiment except that a configuration relationship between the AC-to-DC conversion circuit 10 and the charging and discharging module 20 is different. In the second embodiment, the charging unit 23 is coupled to the battery unit 21 and an AC input side of the AC-to-DC conversion circuit 10 (as shown in FIG. 3A, the charging unit 23 is coupled to the AC power source 100). When the battery unit 21 is charged, the charging unit 23 receives the AC power source 100 and converts it into a voltage that is suitable for charging the battery unit 21. Moreover, when the AC power source 100 is abnormal, the battery unit 21 outputs electric energy, and the output voltage of the battery unit 21 is boosted by the boost conversion unit 22 to provide the second DC power source. Therefore, each power module 30 receives the second DC power source, and converts the second DC power source to provide the power required for each load 200 to uninterruptedly supply power to each load 200.

As shown in FIG. 3B, the third embodiment of the uninterruptible power supply with DC output of the present disclosure is substantially the same as the first embodiment, except that a configuration relationship between the AC-to-DC conversion circuit 10 and the charging and discharging module 20 is different. In the third embodiment, the charging unit 23 is coupled to the battery unit 21 and an internal DC side of the AC-to-DC conversion circuit 10 (as shown in FIG. 3B, the charging unit 23 is coupled to a position between an AC input side and a DC output side of the AC-to-DC conversion circuit 10). For example, the AC-to-DC conversion circuit 10 shown in FIG. 2A is a flyback circuit 11a, the charging unit 23 may be coupled to an output side of the full-wave rectifying circuit (i.e., an input side of the flyback circuit 11a) to implement that the charging unit 23 is coupled to the internal DC side of the AC-to-DC conversion circuit 10.

Figure 4A:
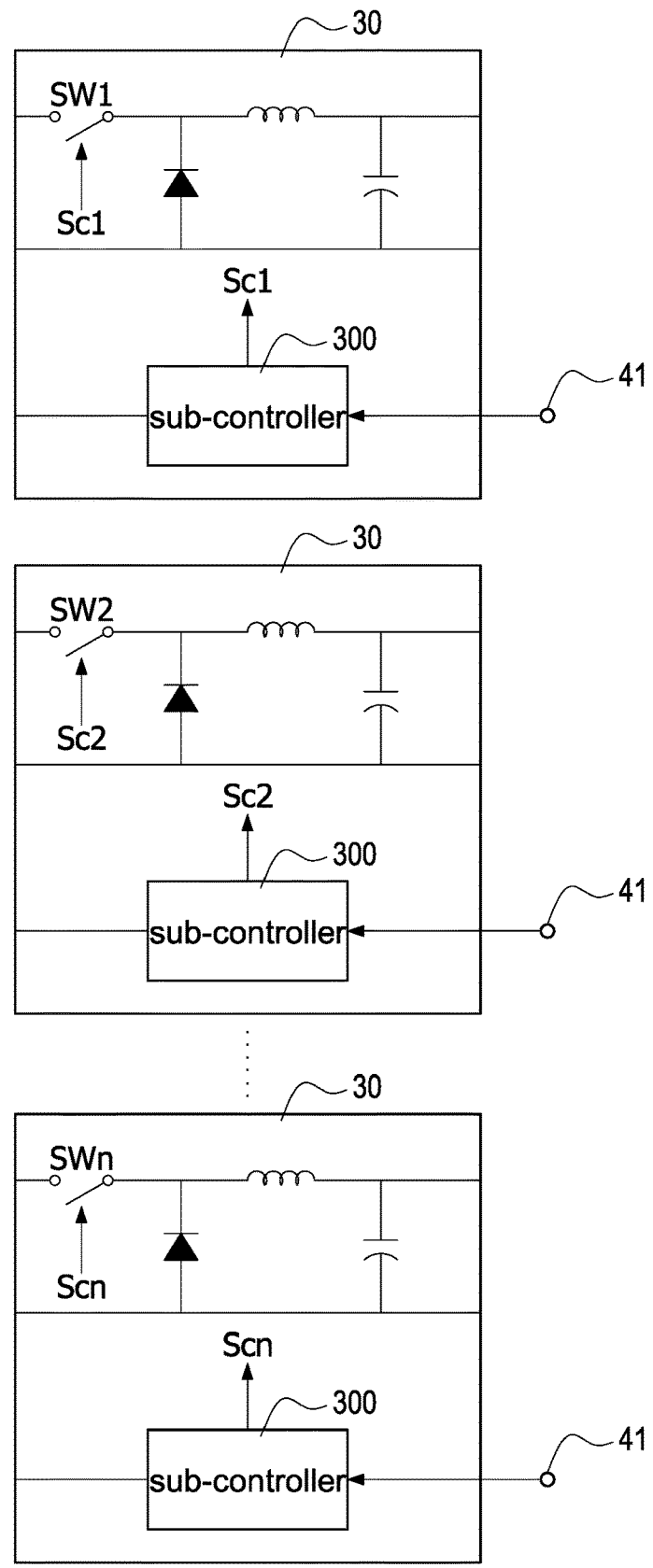
FIG. 4A to FIG. 4C are circuit block diagrams showing the configuration of power modules and operation units of the uninterruptible power supply with DC output according to the first embodiment of the present disclosure.
Figure 4B:
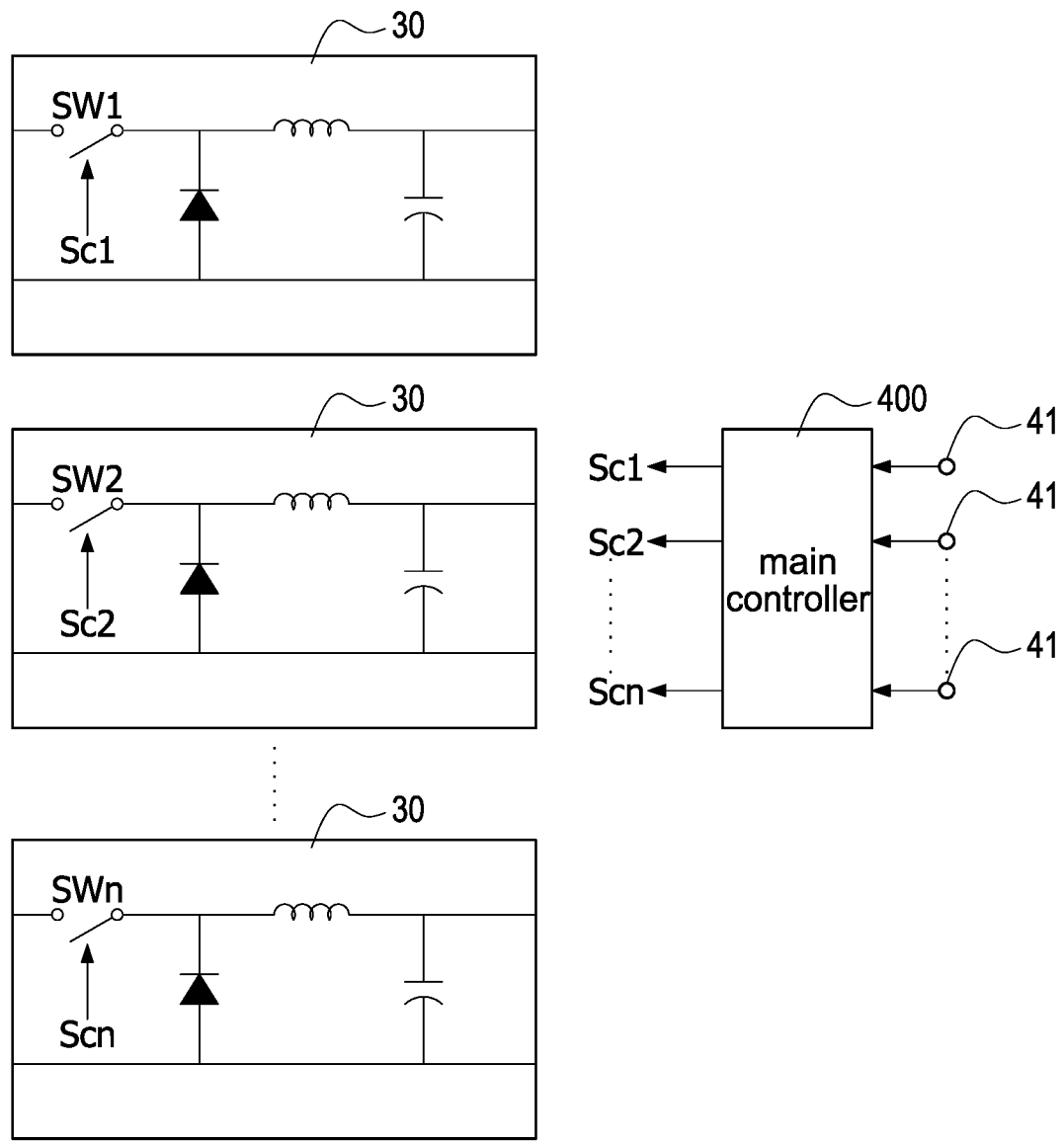
Figure 4C:
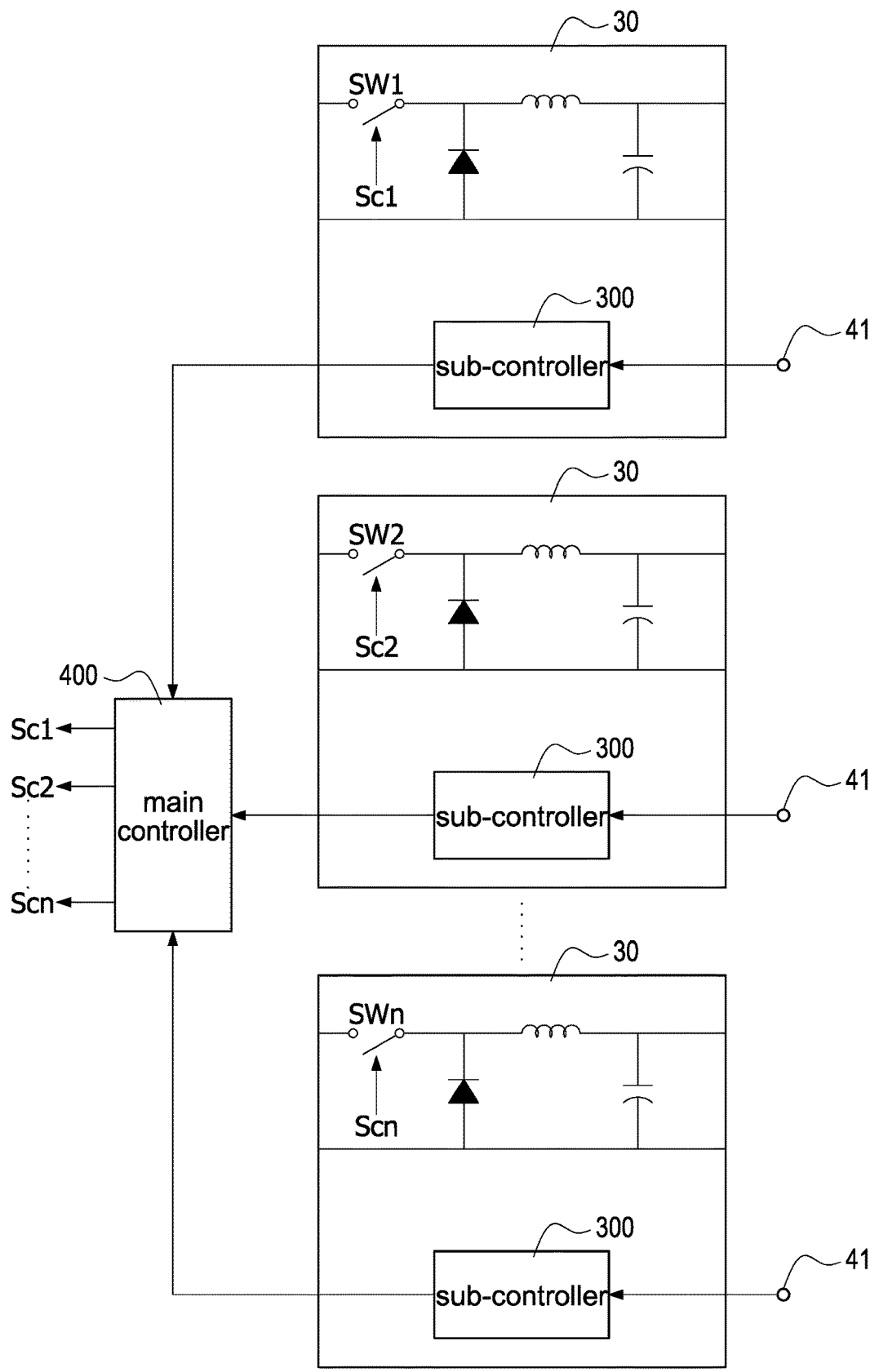

Please refer to FIG. 4A to FIG. 4C, which are circuit block diagrams showing the configuration of the power modules 30 and the operation units 41 of the uninterruptible power supply with DC output according to the first embodiment of the present disclosure. In the first embodiment of the present disclosure, each power module 30 includes a buck circuit with a power switch (SW1, SW2, . . . , SWn as shown in FIG. 4A). The buck circuit receives one of the first DC power source and the second DC power source, and converts it to control the output voltage of each power module 30 to provide the power required for each load 200. In FIG. 4A to FIG. 4C, each operation unit 41 may correspondingly control one power module 30, or each operation unit 41 may simultaneously control two or more than two power modules 30. Further, each operation unit 41 may control each power switch (SW1, SW2, . . . , SWn) through one sub-controller 300, and further each operation unit 41 may simultaneously control two or more than two power switches (SW1, SW2 . . . , SWn) through two or more than two sub-controllers 300.

As shown in FIG. 4A, in the first embodiment of the present disclosure, the first configuration relationship between the power modules 30 and the operation units 41 is: each operation unit 41 controls at least one power switch (SW1, SW2, . . . , SWn) through one sub-controller 300 included in at least one power module 30. For example, one sub-controller 300 outputs a control signal Sc1 to control the power switch SW1, another sub-controller 300 outputs a control signal Sc2 to control the power switch SW2, and further another sub-controller 300 outputs a control signal Scn to control the power switch SWn. The control signals Sc1-Scn may be pulse width modulation (PWM) control signals, and a duty cycle of each power switch (SW1, SW2, . . . , SWn) is controlled to control the output voltage of each power module 30. Each of the power switches (SW1, SW2, . . . , SWn) is correspondingly coupled to each of the sub-controllers 300, and each of the sub-controllers 300 is communicatively coupled to each other to provide a control communication between the power switches (SW1, SW2, . . . , SWn). The control communication may control the communication mode of power distribution between the power modules 30 according to the power required for each load 200.

As shown in FIG. 4B, in the first embodiment of the present disclosure, the second configuration relationship between the power modules 30 and the operation units 41 is: each operation unit 41 controls at least one power switch (SW1, SW2, . . . , SWn) through a main controller 400. For example, the main controller 400 outputs the control signal Sc1 to control the power switch SW1, outputs the control signal Sc2 to control the power switch SW2, and outputs the control signal Scn to control the power switch SWn. Similarly, the control signals Sc1-Scn may be pulse width modulation (PWM) control signals, and the duty cycle of each power switch (SW1, SW2, . . . , SWn) is controlled to control the output voltage of each power module 30. The power switches (SW1, SW2, . . . , SWn) are respectively coupled to the main controller 400, and the main controller 400 provides a control communication between the power switches (SW1, SW2, . . . , SWn). The control communication may control the communication mode of power distribution between the power modules 30 according to the power required for each load 200.

As shown in FIG. 4C, in the first embodiment of the present disclosure, the third configuration relationship between the power modules 30 and the operation units 41 is: each operation unit 41 controls at least one power switch (SW1, SW2, . . . , SWn) through the main controller 400 and the sub-controllers 300 included in at least one power module 30. For example, at least one sub-controller 300 receives information of the power required selected by each operation unit 41 to each load 200, and then transmits the information of the required power of each load 200 to the main controller 400. The main controller 400 outputs control signal Sc1 to control the power switch SW1, outputs the control signal Sc2 to control the power switch SW2, and outputs the control signal Scn to control the power switch SWn according to the received information of the required power. Similarly, the control signals Sc1-Scn may be pulse width modulation (PWM) control signals, and the duty cycle of each power switch (SW1, SW2, . . . , SWn) is controlled to control the output voltage of each power module 30. The main controller 400 is coupled to each sub-controller 300 and each of the power switches (SW1, SW2, . . . , SWn), and the main controller 400 provides a control communication between the power switches (SW1, SW2, . . . , SWn). The control communication may control the communication mode of power distribution between the power modules 30 according to the power required for each load 200.

In order to facilitate the description of the operation principle of the uninterruptible power supply with DC output according to the first embodiment of the present disclosure, the following description will be made by exemplified numerical values, but the present disclosure is not limited thereto. Taking FIG. 1 as an example, when the AC power source 100 is normal, the AC-to-DC conversion circuit 10 converts the voltage of the AC power source 100 (for example, 110 volts), and boosts it to 400 DCV as the first DC power source, so that each power module 30 may receive the first DC power source to supply the power required for each load 200. When the battery unit 21 is charged, the charging unit 23 converts the voltage of the first DC power source (400 DCV, and the available rated power is 2400 W) into a charging voltage of the battery unit 21 (for example, 48 DCV) for charging the battery unit 21. When the AC power source 100 is abnormal, the output voltage of the battery unit 21 is converted by the boost conversion unit 22 and boosted to 400 DCV as a second DC power source. Therefore, each power module 30 may receive the second DC power source to supply power required for each load 200 to uninterruptedly supply power to each load 200.

Furthermore, when the user selects the power required for a first load 200 through the operation unit 41 (which may be a dip switch, a knob, etc.). For example, the supply voltage of the first load 200 (for example, 60 DCV) and/or the supply power (for example, 300 W) are selected. At this time, with reference to one of FIG. 4A to FIG. 4C, the main controller 400 and/or the sub-controller 300 receives the information of the power required for the first load 200 (i.e., a DC supply voltage is 60 V and/or a supply power is 300 W). Therefore, the duty cycle of the power switch SW1 of a first power module 30 is controlled such that the voltage output of the first power module 30 is 60 V and/or the output current thereof is 5 amps to supply the power required for the first load 200. Further, it is assumed that the maximum output power of the first power module 30 is only 150 W. When one operation unit 41 is adjusted to the required 300 W value corresponding to the first load 200, the main controller 400 and/or the sub-controller 300 may simultaneously control the first power module 30 (150 W) and the second power module 30 (150 W) to supply power required for the first load 200 at the same time according to the required power selected by the operation unit 41. Thus, the power required for the first load 200 (300 W) is met. However, the quantity relationship among the operation units 41, the power modules 30, and the loads 200 is not limited thereto.

Furthermore, when the number of the loads 200 is plural, the main controller 400 and/or the sub-controller 300 receive the information of the power required for each load 200, afterward controlling the duty cycle of the power switches (SW1, SW2, . . . , SWn) of the power modules 30, thereby supplying the voltage and/or power required for each of the selected loads 200.

Further, if the sum of the power supplies required for each selected load 200 exceeds the rated power supplied by the AC-to-DC conversion circuit 10, it may be known that the information of the supply power required for each load 200 through the communication between the sub-controllers 300 (as shown in FIG. 4A), integrated by the main controller 400 (as shown in FIG. 4B), or integrated by the sub-controllers 300 with the main controller 400 (as shown in FIG. 4C). Thereby, the duty cycle of the power switches (SW1, SW2, . . . , SWn) of the corresponding power modules 30 may be controlled to proportionally reduce the supply power so as to continuously supply power to each load 200. Alternatively, the duty cycle of the power switches (SW1, SW2, . . . , SWn) of the corresponding power modules 30 may be controlled according to the priority (the high and low) of supplying power. It may ensure the load 200 with higher priority of supplying power can obtain the required power supply, afterward, the remaining loads 200 with lower priority of supplying power can obtain part of the required power supply according to the high or low power required to continuously supply power to each load 200.

Figure 5:
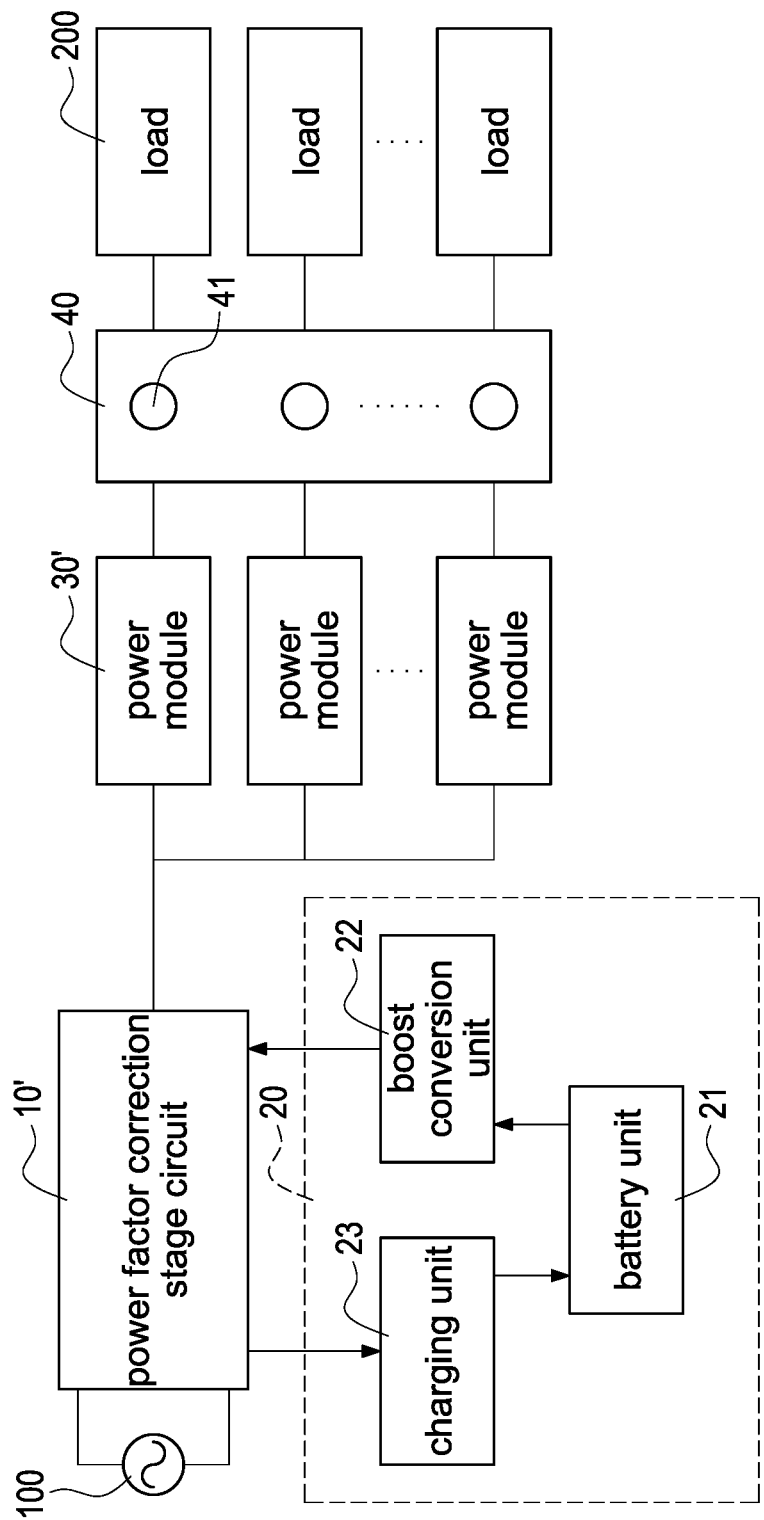
FIG. 5 is a structural diagram of the uninterruptible power supply with DC output according to a fourth embodiment of the present disclosure.
Figure 6A:
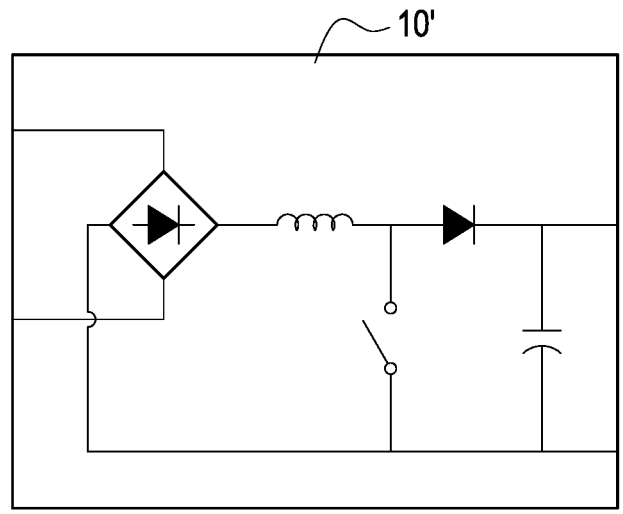
FIG. 6A to FIG. 6B are circuit diagrams of a power factor correction stage circuit of the uninterruptible power supply with DC output according to the present disclosure.
Figure 6B:
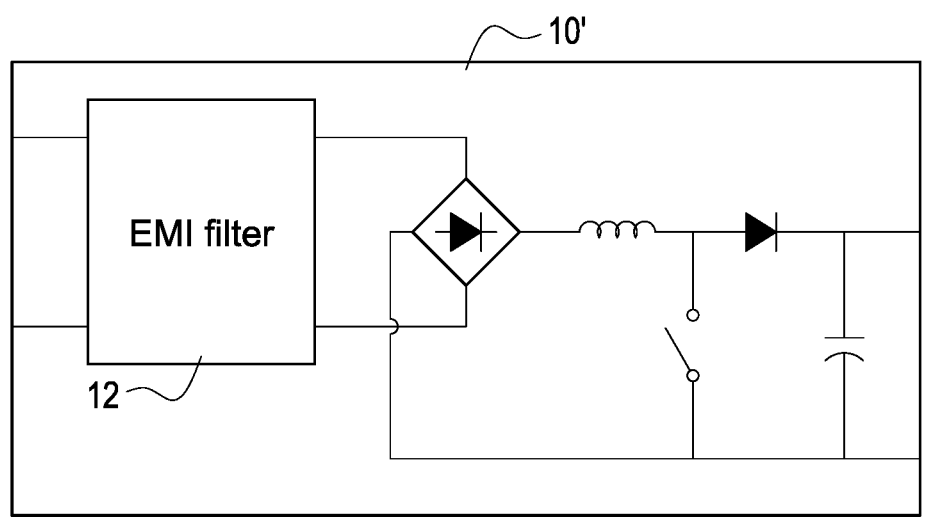

Please refer to FIG. 5 to FIG. 6B. FIG. 5 is a structural diagram of the uninterruptible power supply with DC output according to a fourth embodiment of the present disclosure, and FIG. 6A to FIG. 6B are circuit diagrams of a power factor correction stage circuit of the uninterruptible power supply with DC output according to the present disclosure. As shown in FIG. 5, the fourth embodiment of the uninterruptible power supply with DC output of the present disclosure is substantially the same as the foregoing first embodiment except that the AC-to-DC conversion circuit 10 with the isolated topology structure 31 in the first embodiment is replaced by a power factor correction stage circuit 10' with a non-isolated topology structure. Each power module 30' in the fourth embodiment further includes an isolated topology structure 31 (see FIG. 8A to FIG. 8C in comparison with each power module 30 in the first embodiment).

In the fourth embodiment of the present disclosure, the charging unit 23 of the charging and discharging module 20 is coupled to the battery unit 21 and an internal DC side of the power factor correction stage circuit 10' (as shown in FIG. 5, the charging unit 23 is coupled between the AC input side and the DC output side of the power factor correction stage circuit 10'). For example, the power factor correction stage circuit 10' shown in FIG. 6A is a boost power factor correction stage circuit, and the charging unit 23 may be coupled to an output side of the full-wave rectifying circuit (i.e., the input side of a boost converter). The solution that the charging unit 23 is coupled to the internal DC side of the power factor correction stage circuit 10' is implemented.

Please refer to FIG. 6A to FIG. 6B, which are circuit diagrams of a power factor correction stage circuit of the uninterruptible power supply with DC output according to the present disclosure. In the fourth embodiment of the uninterruptible power supply with DC output of the present disclosure, the power factor correction stage circuit 10' may be a boost power factor correction stage circuit comprising a full-wave rectifying circuit and a boost converter (as shown in FIG. 6A). Alternatively, the power factor correction stage circuit 10' may also be a boost power factor correction stage circuit further comprising the EMI filter 12 (as shown in FIG. 6B).

Figure 7:
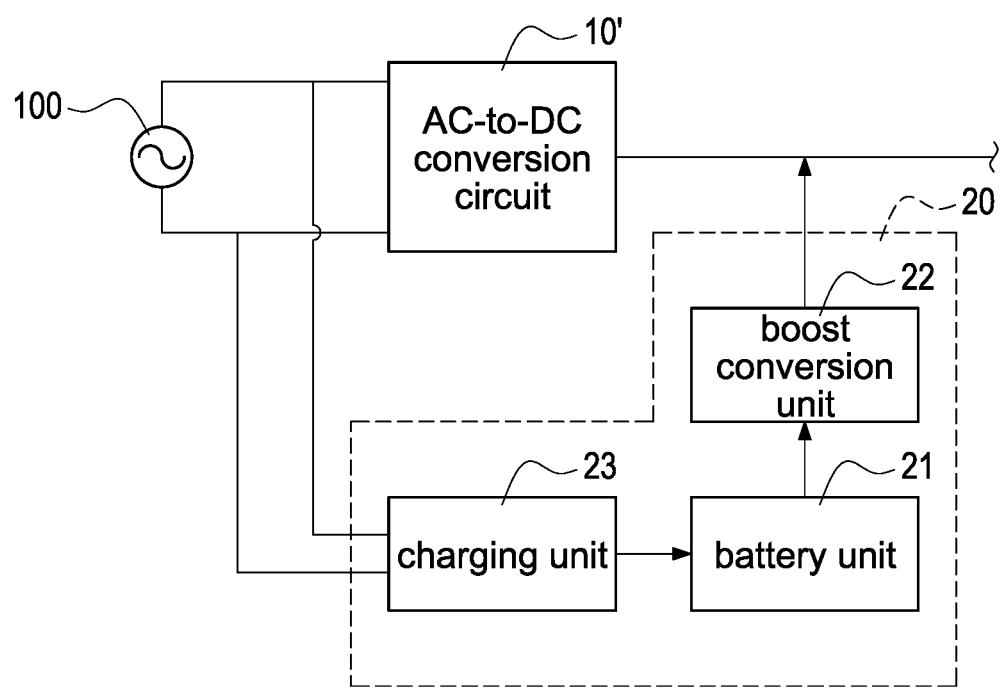
FIG. 7 is a circuit block diagram showing the configuration of the power factor correction stage circuit and the charging and discharging module of the uninterruptible power supply with DC output according to a fifth embodiment of the present disclosure.

Referring to FIG. 7, which is a circuit block diagram showing the configuration of the power factor correction stage circuit and the charging and discharging module of the uninterruptible power supply with DC output according to a fifth embodiment of the present disclosure. The fifth embodiment of the present disclosure is substantially the same as the foregoing fourth embodiment except that the charging unit 23 of the charging and discharging module 20 is coupled to the battery unit 21 and the AC input side of the power factor correction stage circuit 10' (as shown in the FIG. 7, the charging unit 23 is coupled to the AC power source 100). When the battery unit 21 is charged, the charging unit 23 receives the AC power source 100 and converts it into a voltage that is suitable for charging the battery unit 21. When the AC power source 100 is abnormal, the battery unit 21 outputs electric energy, and the output voltage of the battery unit 21 is boosted by the boost conversion unit 22 to provide the second DC power source. Therefore, each power module 30 receives the second DC power source and converts the second DC power source to provide the power required for each load 200 to uninterruptedly supply power to each load 200.

Figure 8A:
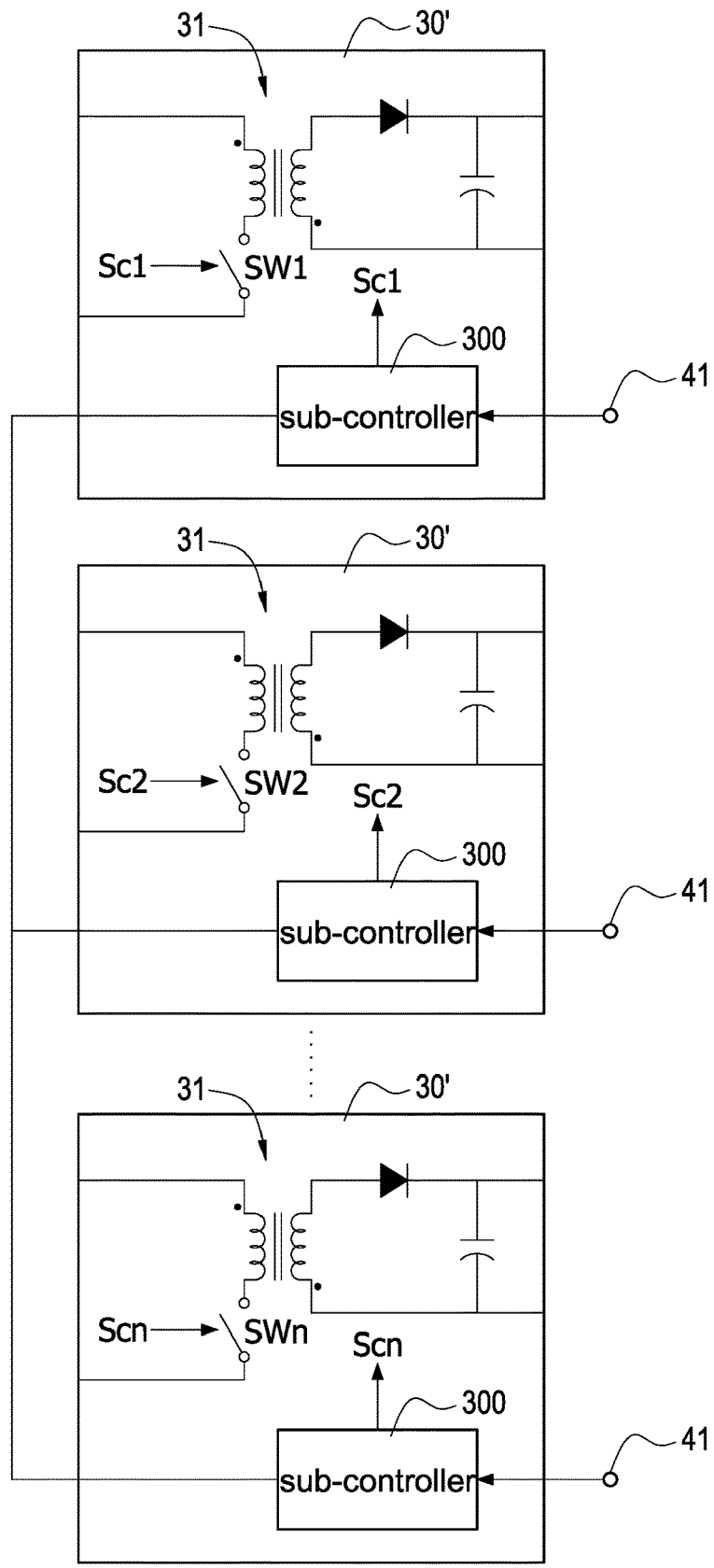
FIG. 8A to FIG. 8C are circuit block diagrams showing the configuration of the power modules and the operation units of the uninterruptible power supply with DC output according to the fourth embodiment of the present disclosure.
Figure 8B:
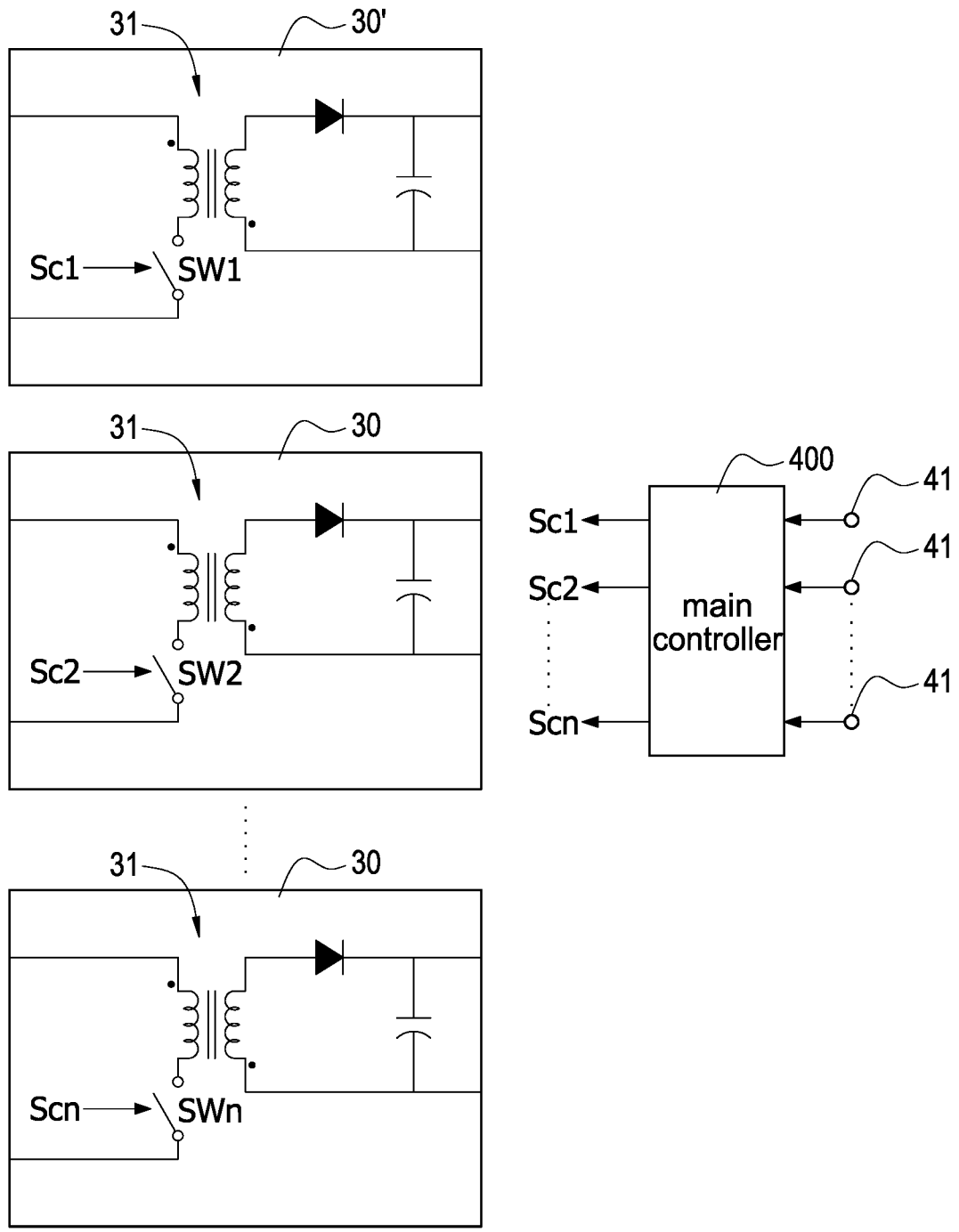
Figure 8C:
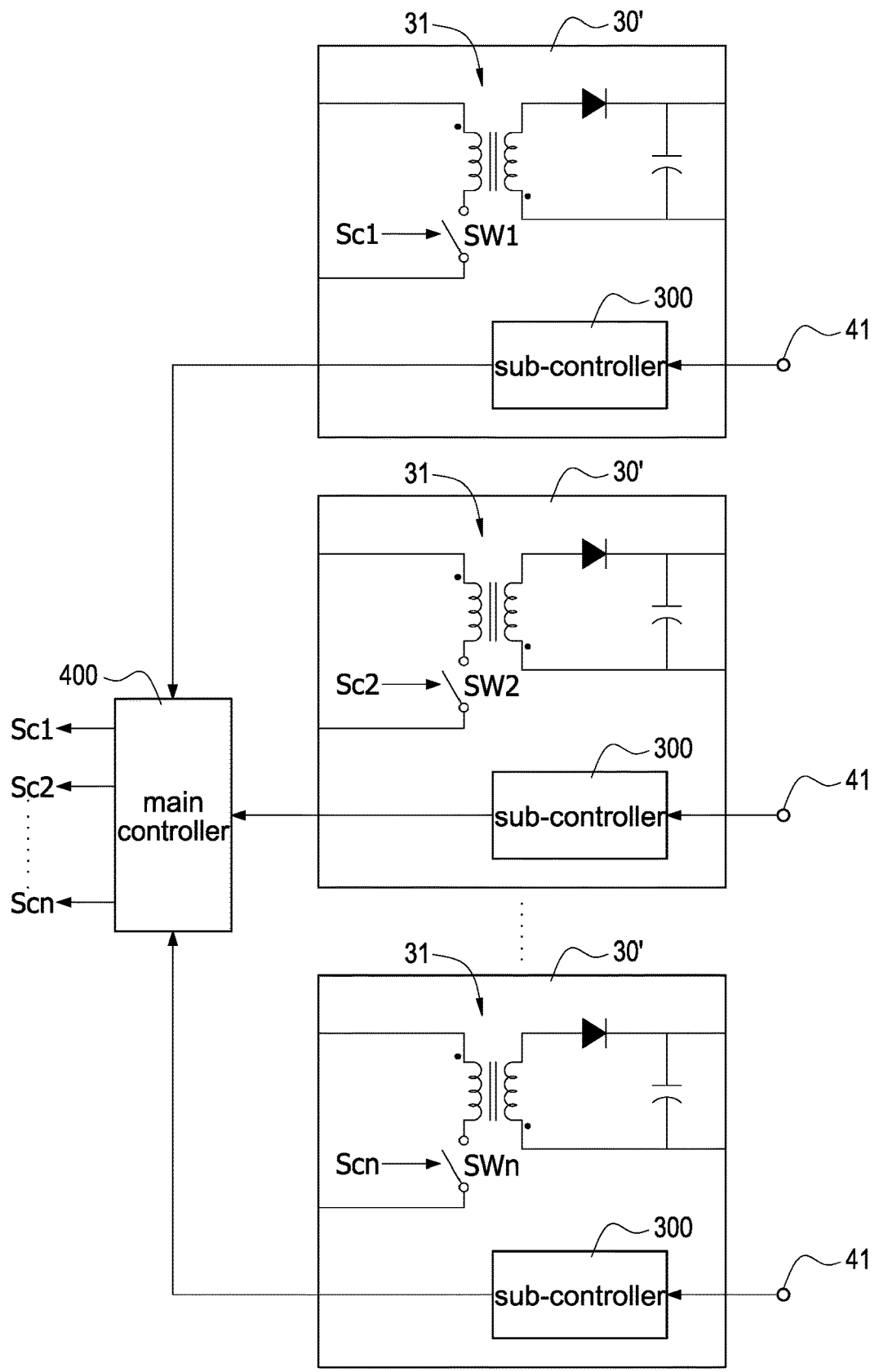

Please refer to FIG. 8A to FIG. 8C, which are circuit block diagrams showing the configuration of the power modules and the operation units of the uninterruptible power supply with DC output according to the fourth embodiment of the present disclosure. The control manners between the operation unit 41 and the power module 30 is similar to that in the first embodiment described above, and the difference is that each power module 30' in the fourth embodiment further includes an isolated topology structure 31 compared to each power module 30 in the first embodiment. For other parts, refer to the corresponding description of the first embodiment, and details are not described herein again.

During use of any one of the uninterruptible power supply with DC output of the present disclosure, as the AC power source 100 is normal, at least one power module 30 receives the first DC power source, and converts the first DC power source to provide power required for at least one load 200; as the AC power source 100 is abnormal, at least one power module 30 receives the second DC power source, and converts the second DC power source to provide the power required for at least one load 200. In addition, since the user may select the power required for each load 200 through at least one operation unit 41 (which may be a dip switch, a knob, etc.), so the at least one power module 30, 30' converts one of the first DC power source and the second DC power source, and provides uninterrupted power to at least one load 200.

To this end, the user can arbitrarily match the different number of loads 200, adjust the power value required for each load 200, arbitrarily adjust the relevant electrical values (for example, at least one of a voltage value and a current value) outputted by the at least one power module 30 according to the user's needs or the requirements of each load 200, and it is possible to protect the safety of the plurality of loads 200 connected to it in the event of sudden abnormal supply situation of the mains, thereby achieving the objectives of reducing the size, reducing the production cost, and avoiding hardware damage and data loss due to sudden power interruption.

The above is only a detailed description and drawings of the preferred embodiments of the present disclosure, but the features of the present disclosure are not limited thereto, and are not intended to limit the present disclosure. All the scope of the present disclosure shall be subject to the scope of the following claims. The embodiments of the spirit of the present disclosure and its similar variations are intended to be included in the scope of the present disclosure. Any variation or modification that may be easily conceived by those skilled in the art in the field of the present disclosure may be covered by the following claims.

What is claimed is:

1. An uninterruptible power supply with DC output comprising:
   an AC-to-DC conversion circuit coupled to an AC power source and configured for outputting a first DC power source,
   a charging and discharging module configured for outputting a second DC power source,
   at least one power module coupled to the AC-to-DC conversion circuit and the charging and discharging module, and configured to receive one of the first DC power source and the second DC power source, and
   a user operation interface disposed between the at least one power module and at least one load, and the user operation interface comprising at least one operation unit,
   wherein the power required for each load is selected by each operation unit so that at least one power module uninterruptedly supplies power to each load.

2. The uninterruptible power supply with DC output in claim 1, wherein as the AC power source is normal, each of the power modules receives the first DC power source, and as the AC power source is abnormal, each of the power modules receives the second DC power source.

3. The uninterruptible power supply with DC output in claim 1, wherein the AC-to-DC conversion circuit comprises an isolated topology structure coupled to the AC power source.

4. The uninterruptible power supply with DC output in claim 1, wherein the charging and discharging module comprises:
   a battery unit,
   a boost conversion unit coupled to the battery unit and the at least one power module, and
   a charging unit is coupled to the battery unit and one of an AC input side, a DC output side, and an internal DC side of the AC-to-DC conversion circuit.

5. The uninterruptible power supply with DC output in claim 1, wherein each of the power modules includes a buck circuit with a power switch, the buck circuit receives one of the first DC power source and the second DC power source, and controls an output voltage of each power module.

6. The uninterruptible power supply with DC output in claim 5, wherein each of the operation units controls each of the power switches through a main controller or a sub-controller included in each of the power modules, each of the power switches is coupled to the main controller or each of the sub-controllers, and the main controller or each of the sub-controllers provides a control communication between each of the power switches.

7. The uninterruptible power supply with DC output in claim 5, wherein each of the operation units controls each of the power switches through a main controller or a sub-controller included in each of the power modules, the main controller is coupled to each of the sub-controllers and each of the power switches, and the main controller provides a control communication between each of the power switches.

8. The uninterruptible power supply with DC output in claim 6, wherein the main controller or each of the sub-controllers controls a duty cycle of each of the power switches with a pulse width modulation manner, thereby controlling the output voltage of each power module.

9. The uninterruptible power supply with DC output in claim 7, wherein the main controller or each of the sub-controllers controls a duty cycle of each of the power switches with a pulse width modulation manner, thereby controlling the output voltage of each power module.

10. An uninterruptible power supply with DC output comprising:
    a power factor correction stage circuit coupled to an AC power source and configured for outputting a first DC power source,
    a charging and discharging module configured for outputting a second DC power source,
    at least one power module coupled to the power factor correction stage circuit and configured to receive one of the first DC power source and the second DC power source, and
    a user operation interface disposed between the at least one power module and at least one load, and the user operation interface comprising at least one operation unit,
    wherein the power required for each load is selected by each operation unit so that at least one power module uninterruptedly supplies power to each load.

11. The uninterruptible power supply with DC output in claim 10, wherein as the AC power source is normal, each of the power modules receives the first DC power source, and as the AC power source is abnormal, each of the power modules receives the second DC power source.

12. The uninterruptible power supply with DC output in claim 10, wherein the charging and discharging module comprises:

a battery unit, a boost conversion unit coupled to the battery unit and the at least one power module, and a charging unit is coupled to the battery unit and one of an AC input side and an internal DC side of the power factor correction stage circuit.

13. The uninterruptible power supply with DC output in claim 10, wherein each of the power modules comprises an isolated topology structure coupled to each of the loads, and each isolated topology structure has a power switch coupled to the power factor correction stage circuit.

14. The uninterruptible power supply with DC output in claim 13, wherein each of the operation units controls each of the power switches through a main controller or a sub-controller included in each of the power modules, each of the power switches is coupled to the main controller or each of the sub-controllers, and the main controller or each of the sub-controllers provides a control communication between each of the power switches.

15. The uninterruptible power supply with DC output in claim 13, wherein each of the operation units controls each of the power switches through a main controller or a sub-controller included in each of the power modules, the main controller is coupled to each of the sub-controllers and each of the power switches, and the main controller provides a control communication between each of the power switches.

16. The uninterruptible power supply with DC output in claim 14, wherein the main controller or each of the sub-controllers controls a duty cycle of each of the power switches with a pulse width modulation manner, thereby controlling the output voltage of each power module.

17. The uninterruptible power supply with DC output in claim 15, wherein the main controller or each of the sub-controllers controls a duty cycle of each of the power switches with a pulse width modulation manner, thereby controlling the output voltage of each power module.

* * * * *